Inventors
Ferdinand O. Smith
William V. Hirschfeld
By Seymour Earle Nichols
Attorneys

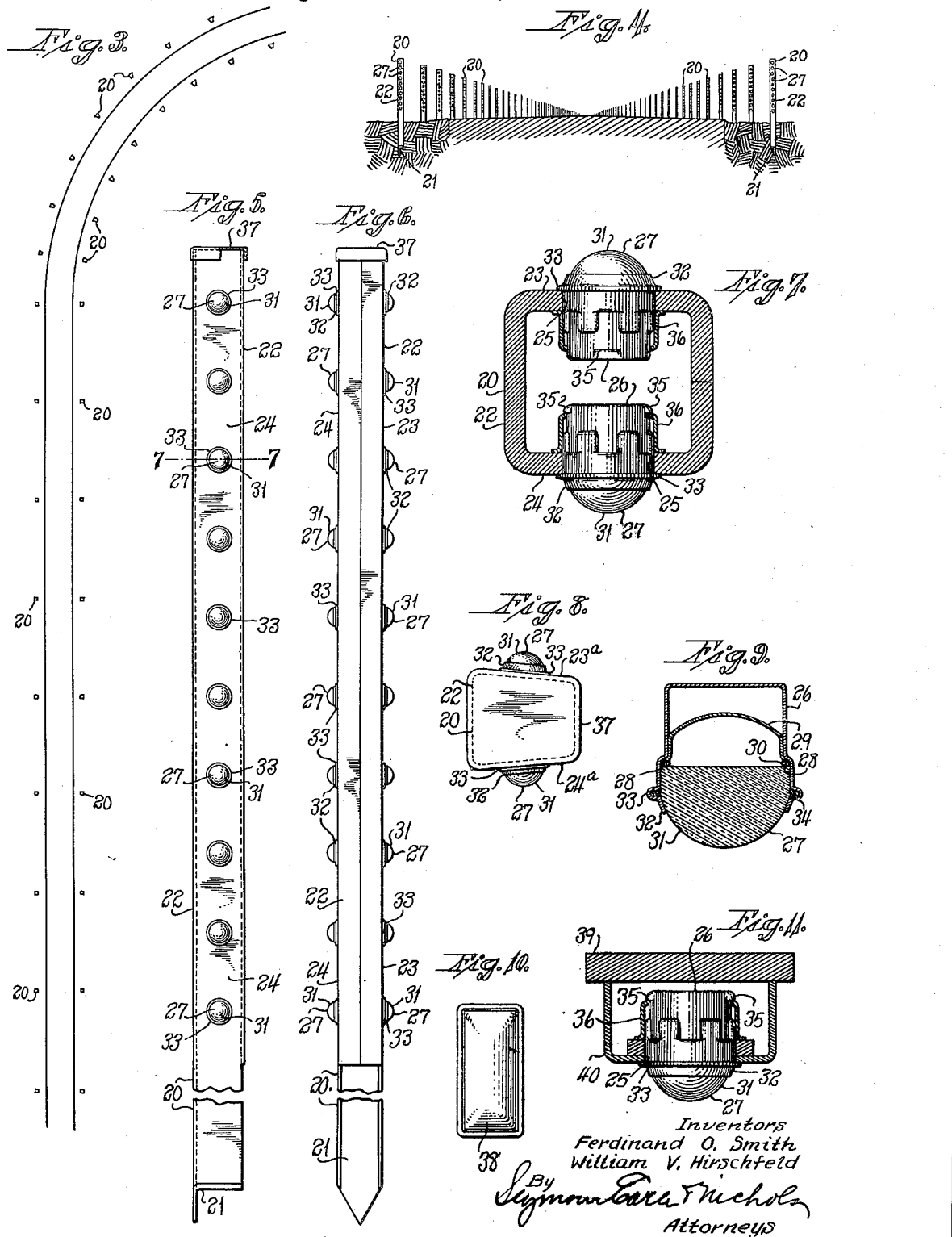

Patented May 11, 1943

2,318,722

UNITED STATES PATENT OFFICE 2,318,722

HIGHWAY-ILLUMINATING SYSTEM

Ferdinand O. Smith, Hamden, and William V. Hirschfeld, New Haven, Conn., assignors to The Guidalite Corporation, Meriden, Conn., a corporation of Connecticut Substituted for abandoned application Serial No. 56,612, December 30, 1935. This application January 18, 1939, Serial No. 251,562

3 Claims. (Cl. 88—82)

This invention relates to highway illuminating systems, and more particularly to the provision of means for creating luminous boundaries of roads, highways and byways, and particularly roads which are not adequately illuminated for safe night driving.

This application is a substitute for our application Serial No. 56,612, filed on December 30, 1935.

In night driving on unilluminated or poorly illuminated roads, there has been, prior to the present invention, the constant mental and real hazard of a person or thing, for instance a large animal or a parked vehicle, being present on the road in the path of the vehicle and yet being unseen by the driver of an automobile.

If the headlights of the automobile were directed high enough and were bright enough, the danger of striking an unseen object is reduced somewhat, but where the object has substantially the same color as the road, even bright headlights might not disclose its presence. Besides, if the headlights are too bright, there is the hazard of the driver approaching from the other direction being blinded. The problem obviously cannot be solved by making the headlights of the automobile brighter.

Another problem in night driving is to indicate far enough in advance the changes of direction of the road in both a vertical and horizontal plane so that the driver may avoid running off the road and possibly into the side of a hill or over an embankment. A solution of this problem has been attempted by the placing of warning signs at curves, but these signs are not adequate and do not indicate the course of the curve.

Heretofore it has been proposed to place light-reflecting units on the ground level along the shoulder or edge of the road for the purpose of outlining the road, and under normal conditions these reflecting means are quite helpful, but they are of no help whatsoever in indicating the presence of a pedestrian who might be walking along the road, and being located at the road level they are quickly covered and hidden by snow, mud and refuse that might accumulate along the side of the road.

The present invention avoids all these difficulties and practically eliminates the real hazard first above referred to by providing along the roadway a continuous succession of posts equispaced and uniformly spaced from the adjacent edge or shoulder of the road and providing on each of these posts, optical light gathering and reflecting means so arranged as to provide an elongate vertical luminous column visible from the vehicle whose lights impinge upon such means. The luminous column, according to the present invention, should be substantial in length and should amount to approximately twenty-seven inches or more. At its lower end it should be elevated thirty inches or less. The post and reflector units, according to the present invention, are spaced along the road from each other by such distances that on the straightaway within a safe stopping distance the luminous columns from succeeding post and reflector units apparently juxtapose to form a substantially continuous luminous wall.

This luminous wall is high enough from the ground and extensive enough in height to be unaffected by mud thrown off the road and by normal snow falls. It is sufficiently elevated from the ground and sufficiently high in itself so that if a person, even a child, should be walking along the road, an interruption or break would occur in the luminous wall, indicating to the driver the presence of some obstruction, and giving the driver an opportunity to slow down or stop in time to avoid an accident.

Besides, the substantially continuous luminous wall receives and reflects back sufficient light from the automobile to indicate the course of the road, even when the car is being approached by another car having extremely bright lights.

The present invention contemplates providing a continuous succession of post and reflector units on both sides of the road and uniformly spaced from the edge of the road, and placing on both the obverse and the reverse faces of the post reflecting means for producing the elongate luminous column. When this is done, the two luminous walls so formed converge at the vanishing point of the road or at a point where the road makes a turn.

To avoid confusion which might occur at the turn of a road, or when proceeding in fog or in a snow storm, the luminous columns on one side of the road preferably have light collecting and reflecting means which is optically characteristically distinguishable from the light collecting and reflecting means on the other side of the road and facing in the same direction. For instance, the light collecting and reflecting means on the obverse side of the post at the right-hand side of the road may advantageously be made up of crystal-clear reflecting units, while that on the reverse side of the posts at the left-hand side of the road may be advantageously made up of alternate crystal-clear and amber reflecting units. Thus, when proceeding in a fog, if the driver will keep to the right of the colored reflectors and to the left of the white reflectors, he will stay on the road. When the driver observes the luminous columns of colored light swinging over toward the columns of uncolored light, he will be apprised that the road turns to the right, and if the white luminous columns swing over toward the colored luminous columns, he will know that the road turns to the left.

Since the posts and the reflecting means mounted thereon are uniform in height, the undulations of the road will be indicated by waves in the luminous wall. Thus, a slight hump in the road, as over a culvert, would be indicated to the driver well in advance, so that his speed may be slackened if that is necessary for safety sake, and the same is true of a dip in the road.

While it is contemplated that for any considerable stretch of road the post and reflector units will be mounted uniform distances from the shoulder of the road, yet, where there is a narrow bridge, the reflectors will be gradually brought closer to the edge of the road and will follow the roadway over the bridge.

By having the luminous columns on opposite sides of the road equally spaced from the edge of the road and especially when they are arranged in couples in gate-like relation, substantially opposite each other, it is an easy matter for the driver to ascertain the center of the road and remain on his own side.

Preferably the spacing between the post reflector units along the straightaway is such that in a fog at least two or possibly three luminous columns may be seen at the same time. The luminous wall of light on the far side of the road does more than merely indicate the width of the road and the contour of the road. It serves to indicate the position of vehicles approaching from the opposite direction, for the vehicle will block out a certain part of the luminous wall of light. If the approaching vehicle has but one headlight or none at all, its outline may be clearly seen by the driver of the approaching vehicle by the amount of the wall of light which is blocked out.

Other features and advantages will hereinafter appear.

In the accompanying drawings:

Fig. 3 is a diagrammatic plan view illustrating a highway equipped with the present invention;

Fig. 4 is a transverse sectional view thereof;

Fig. 5 is a broken face view of one form which a double-faced illuminating post of the present invention may assume;

Fig. 6 is a broken view looking toward the outside edge thereof;

Fig. 7 is a transverse sectional view taken on the line 7—7 of Fig. 5;

Fig. 8 is a top-end view of an illuminating post designed for use on relatively-sharp curves;

Fig. 9 is a diagrammatical sectional view through one of the reflector-buttons;

Fig. 10 is a face view of a rectangular reflector-button suitable for use in connection with the present invention; and Fig. 11 is a transverse sectional view of one form which a single-faced illuminating post may assume in accordance with the present invention.

Figure 1:
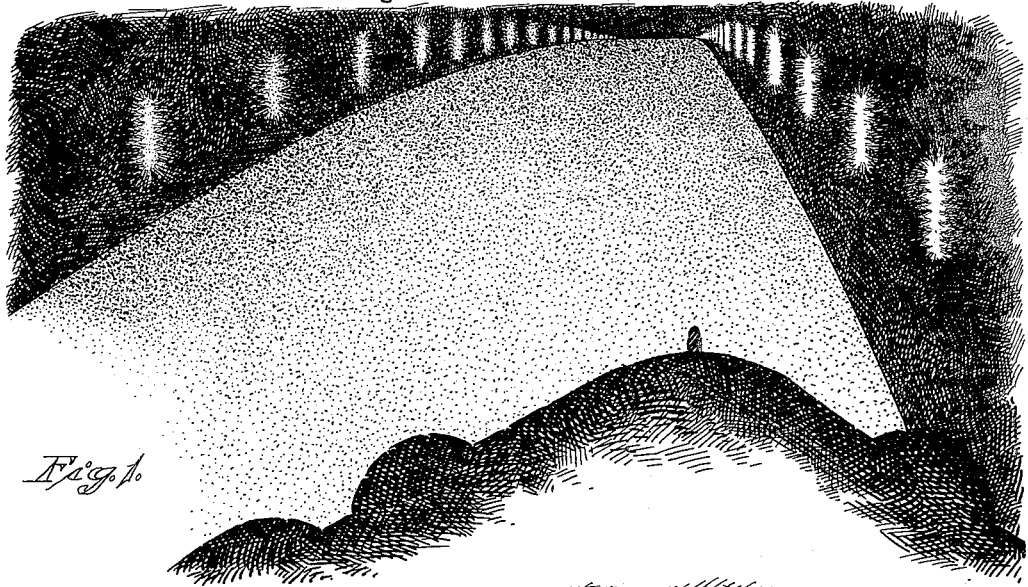
Fig. 1 is a perspective view illustrating the present invention as used on an up-grade section of a highway.
Figure 2:
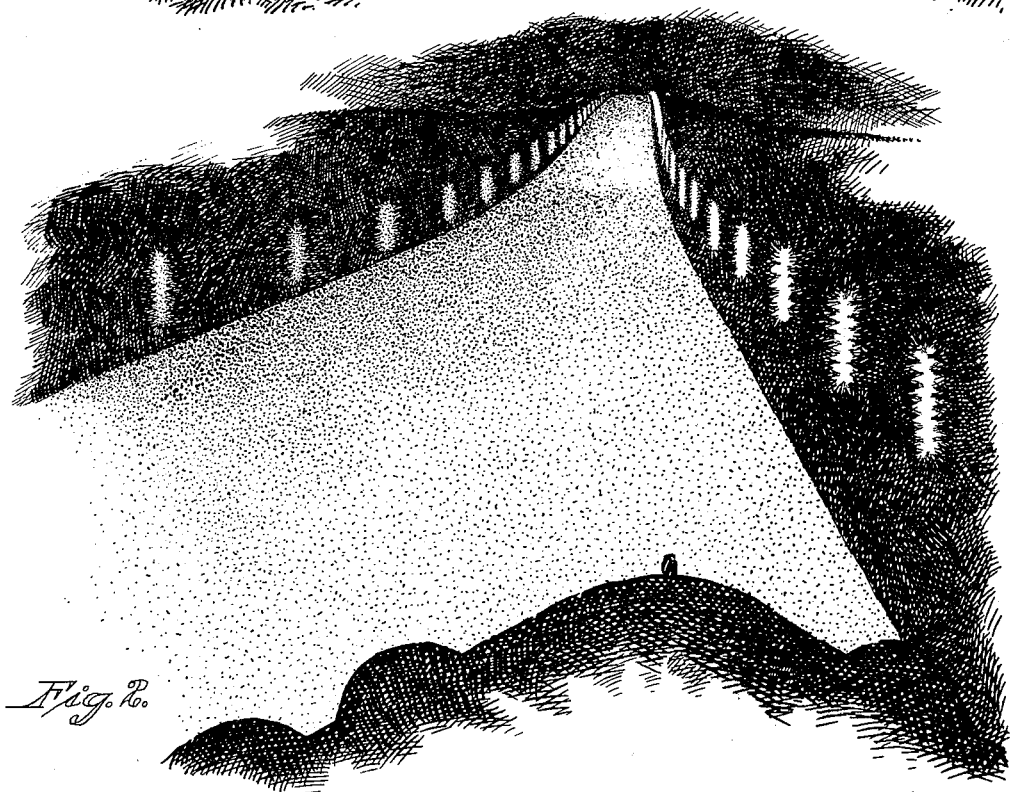
Fig. 2 is a similar view illustrating the effect of the present invention on a straightaway stretch of highway.

In its preferred embodiment, the present invention contemplates the employment along each of the respective opposite edges of a highway of a continuous series of illuminating posts to produce a wall- or fence-like effect along each side of the highway, as indicated particularly well in Figs. 1 to 4 inclusive of the accompanying drawings. The illuminating posts employed are preferably of a double-faced character, such as is particularly well shown in Figs. 5 to 8 inclusive, the structural details and component-parts arrangement of which posts may vary widely.

The illuminating post shown in Figs. 5 to 8 inclusive of the accompanying drawings includes a sheet-metal standard or support, generally designated by the numeral 20, and having its lower portion 21 of trough or U-shaped form in cross-section and its upper portion 22 of rectangular tube-form in cross-section. The respective opposite side-walls or faces 23 and 24 of the tubular portion 22 of the standard 20 are each provided with a vertical series of perforations 25. Into each of the perforations 25 is fitted the substantially-cylindrical body-portion 26 of a so-called "reflector-button," generally designated by the numeral 27.

The body-portion 26 of each of the reflector-buttons 27 is of cup-shaped form (Fig. 9), preferably formed of light non-corrosive sheet-metal, and having its cylindrical wall upset to provide outwardly-facing stop-shoulders 28 against which is seated the outturned flange of a concavo-convex reflector 29. The concave outer face of the said reflector is preferably silvered and polished to afford a maximum degree of light reflection. Over the outturned flange of the reflector 29 is placed a washer 30 of soft material, against the outer face of which rests the flat under-side of a plane-convex lens 31. The lens 31 and hence the washer 30 and reflector 29 are held in place by spinning the edge 32 of the body-portion 26 inwardly and part-way over the convex outer portion of the lens, as particularly well shown in Fig. 9. Immediately below its inturned edge 32, the body-portion 26 is formed with an annular stop-bead 33, providing an interior channel for the reception of a water-proof packing-ring 34 and serving to engage with the outer surface of the respective opposite walls 23 or 24, as the case may be, of the standard 20, as clearly shown in Fig. 7.

For the purpose of retaining the various reflector-buttons 27 in place in the standard 20, the body-portion 26 of each reflector-button is provided near its inner end with a pair of retaining bosses 35, located diametrically opposite each other and over which is fitted a retaining-collar 36 engaging with the inner face of the adjacent side-wall 23 or 24, as the case may be, of the standard 20. Preferably, and as shown particularly well in Fig. 5, each standard is provided with an inverted cup-shaped cap 37 serving to guard against the entry of rain or snow into the tubular portion 22 of the standard.

As thus constructed, each illuminating post is, by virtue of the vertical arrangement of the reflector-buttons, provided in effect on each of its respective opposite sides with what may be termed "elongated upwardly-extending light-reflecting means." The said means is, therefore, effective despite appreciable variations in the level at which the light from automobiles may strike.

This elongate vertical light collecting and reflecting means provides a vertical luminous column visible from a vehicle having sources from whence light is projecting toward said means and making the same luminous. The units, each formed by the post and light reflecting means carried thereby, are spaced along the road at such distances that within safe stopping distance the luminous columns from succeeding post and reflector units apparently juxtapose to form a substantially continuous luminous wall. Any interruption in this luminous wall would indicate to the driver of the vehicle that a pedestrian or some obstruction or thing was present on the side of the road being traversed by the vehicle, and thus the driver would be warned and could slow down and stop if necessary.

Heretofore it was proposed to place short posts along the road in position to be struck by overhanging portions of a vehicle should the right-side wheels leave the surface of the road, but these posts, even if provided with reflecting means, would not produce a wall of light high enough to be blocked out or interrupted by a pedestrian, obstruction, or other thing.

It was also proposed to have posts placed at intervals along the roadway with reflectors on them, but such reflectors did not extend for a sufficient height, nor were they located at the proper level to form a substantially continuous luminous wall, an interruption of which would indicate the presence of something.

According to the present invention, the vertical luminous column preferably starts about two feet from the level of the roadway and extends vertically for about two and one-half feet. In other words, the top of the reflector is preferably about four and one-half or five feet from the surface of the ground, and the wall of light would be interrupted by the torso of a person walking along the road.

In order to provide reflecting means of differential reflecting character, for the purpose as will be hereinafter described, a rectangular reflector-button 38 (Fig. 10) may be employed in place of or in combination with the round reflector-buttons 27, before described. Differential reflecting properties may also be secured by differential coloration of the lenses, such as 31, that is to say, for instance, some of the lenses may be crystal-clear and others may have amber, green or other distinctive coloration. Differentiation in the reflecting characteristics of various illuminating posts may also be effected by arranging reflecting-buttons thereon in different patterns.

The standard 20 illustrated in Figs. 5 to 7 inclusive, has its respective opposite side-walls or faces 23 and 24 parallel for use on straightaway stretches of highway or on curves. For use on sections of a highway having rather sharp turns, it is preferable under some conditions to employ an illuminating post of the character shown in Fig. 8, in which it will be noted that the respective opposite side-walls 23ᵃ and 24ᵃ converge.

The illuminating posts, above described, are all of a double-faced character, inasmuch as each of their respective opposite side-walls or faces is provided with a plurality of reflectors, but if desired, single-faced posts of the character shown in Fig. 11 may be employed. In the figure just referred to, the standard 39 is of rectangular form in cross-section and has mounted upon one of its faces a sheet-metal box 40, in which may be mounted the desired number of reflector-buttons.

For the purpose of the better understanding of the effects achieved by the present invention, let it be presumed that each of the respective opposite sides of the highway, shown in Figs 1 to 4 inclusive, is provided with a series of double-faced illuminating posts, of the general character shown in Figs. 5 to 7 inclusive.

Let it further be presumed that each illuminating post is provided on one side or face with a vertical series of reflector-buttons or other reflectors of crystal-clear character, and that the opposite side or face of each of the said posts is equipped with a vertical series of reflector-buttons of alternate amber coloration and crystal-clear. The illuminating posts as thus equipped with the reflectors referred to, are mounted adjacent the side of the road a suitable distance therefrom, so that the crystal-clear reflector-buttons face back to traffic traveling on the right side of the road.

Under the arrangement just described, traffic moving in either direction would have visible to it on the right only the faces of the illuminating posts equipped with crystal-clear reflectors, and would have visible to the left the opposite faces of the various illuminating posts carrying alternate clear and amber reflectors. Thus, the illuminating posts on one side of the road are readily distinguishable from those on the other side.

Tests have shown that very satisfactory results are obtained when the illuminating posts are spaced from each other on a given side of a highway a distance of about one hundred and twenty-five feet for a straight section of the highway and seventy-five feet on relatively sharp curves. Preferably, each illuminating post on one side of the highway will be complemented by another illuminating post placed substantially directly-opposite on the other side of the highway, thus providing a continuous series of gate-like effects. The illuminating posts may be spaced varying distances from the edge of the highway, depending on conditions, and may, for instance, be spaced from two to ten feet distant in the direction referred to. The distances above enumerated may, of course, be varied to fit conditions, but it is desirable that at a given location, the illuminating-posts on one side of the highway should be spaced the same distance from the edge of such highway as the illuminating posts on the other side thereof, thus enabling a motorist to accurately gauge the location of the center of the road, with the result that he will maintain his car in a path on the proper side of the road-center.

The reflector-buttons or other reflectors employed should preferably be of such character as to have a relatively wide angle of reflection. Thus, for instance, reflectors having capacity for reflecting or dispersing light received from headlights of vehicles laterally to about 20° have been found satisfactory.

It has also been ascertained that a vertical series of reflector-buttons or their equivalent of about twenty-seven to thirty inches in extent is adequate for the purpose intended, especially when the lowermost portion of the series of reflectors is located from about eighteen to thirty inches above the surface of the highway. The illuminating post herein illustrated has a series of ten reflectors arranged one above the other on three-inch centers, but it is obvious that a single reflector of sufficient extent might be used for the purpose in place of the multiplicity of individual reflector-buttons.

Observations made from installations of the improved highway-illuminating or demarcation system above described have shown that the blinding effect of the headlights of on-coming traffic is so largely minimized as to enable a driver to continue on his course with confidence and assurance and with minimum danger both to himself and to other traffic, whether vehicular or pedestrian. Furthermore, not only are pedestrians and parked vehicles easily noticed by a driver, owing partially at least to their interrupting the reflections from the various reflectors, but pedestrians themselves, if walking with their backs to an on-coming car, are apprised of the approach of such on-coming car by the reflections seen by the pedestrians in the continuous series of illuminating posts located in advance of their position on the highway.

When the so-called "reflector-buttons" are properly designed, their effect is to actually illuminate the highway to an effective degree by light reflected from the headlights of vehicles.

By equipping the opposite sides of the illuminating posts with suitable reflectors and mounting such illuminating posts on each of the respective opposite sides of the highway, a continuous traffic channel is outlined for the guidance of automobilists, thus enabling them to instinctively judge the lcoation of the center of the highway. By suitable differentiation in the character of the reflectors located to the left of a driver, as compared to those located to the driver's right, confusion is avoided as to which series of illuminating posts are to be kept to the driver's left and which are to be kept on his right.

It has also been observed that by placing a pair of illuminating posts directly opposite each other on the respective opposite sides of the highway, an effect is obtained which may be aptly termed a "gate effect" between which a driver may guide his car. This effect is heightened by a differentiation in the character of the reflectors located on the opposite sides of the highway. The so-called "gate effect," just referred to, is of maximum advantage on curved portions of a highway and this arrangement, especially when combined with differentiation in the character of the reflectors on the respective opposite sides of the highway, affords a guide which is effective under the most adverse conditions of weather, traffic, or both.

By differentiating the character of the reflectors on the respective opposite sides of the highway, automobilists are enabled to follow a safe course on the highway by observing a simple and obvious rule. i. e., to always keep an illuminating post of one reflecting character on their right and the posts of another reflecting character on their left, and never to drive between two illuminating posts of similar reflecting character.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

We claim:

1. A highway illuminating system comprising two series of reflector-illuminating units arranged in couples in gate-like relation substantially opposite each other on opposite sides of the right of way and equidistant from the center thereof, the units of each series being longitudinally equidistant on the straightaway and separated longitudinally by a distance greater than the width of the road and combining to form a reflector-lighted corridor, each vertical unit of both series extending vertically in a zone above the normal headlight-level and below the normal driving eye-level of the highway, the reflector-illuminator units on each side of the roadway being provided on one side or face with a series of reflectors of crystal clear character and on the opposite side or face with a series of reflectors consisting of amber reflectors alternating with crystal clear reflectors, the series of uncolored reflectors on one side of the road facing in a direction opposite to that of the series of uncolored reflectors on the opposite side of the road, the double series of reflector-lighted units forming a lighted zone having a substantially uniform relation to the highway in the lateral, longitudinal and vertical directions, capable of reflecting light projected thereon by a headlight approaching the rear of a pedestrian on the highway.

2. A road illuminating system comprising two series of reflector-illuminating units arranged in couples in gate-like relation substantially opposite each other on opposite sides of the right of way and equidistant from the center thereof, the units of each series being longitudinally equidistant on the straightaway and separated longitudinally by a distance greater than the width of the road and combining to form a reflector-lighted corridor, each vertical unit of both series extending vertically in a zone above the normal headlight-level and below the normal driving eye-level of the highway, the reflector-illuminator units on each side of the roadway being provided on one side or face with a series of reflectors of crystal clear character and on the opposite side or face with a series of reflectors consisting of colored reflectors alternating with crystal-clear reflectors, the series of uncolored reflectors on one side of the road facing in a direction opposite to that of the series of uncolored reflectors on the opposite side of the road, the double series of reflector-lighted units forming a lighted zone having a substantially uniform relation to the highway in the lateral, longitudinal and vertical directions, capable of reflecting light projected thereon by a headlight approaching the rear of a pedestrian on the highway.

3. A road illuminating system comprising a series of reflector-illuminating units arranged on each side of the right of way and equidistant from the center thereof, the units of each series being longitudinally equidistant on the straightaway and separated longitudinally by a distance greater than the width of the road and combining to form a reflector-lighted corridor, each vertical unit of both series extending vertically in a zone above the normal headlight-level and below the normal driving eye-level of the highway, the reflector-illuminator units on each side of the roadway being provided on one side or face with a series of reflectors of crystal-clear character and on the opposite side or face with a series of reflectors consisting of colored reflectors alternating with crystal-clear reflectors, the series of uncolored reflectors on one side of the road facing in a direction opposite to that of the series of uncolored reflectors on the opposite side of the road, the double series of reflector-lighted units forming a lighted zone having a substantially uniform relation to the highway in the lateral, longitudinal and vertical directions, capable of reflecting light projected thereon by a headlight approaching the rear of a pedestrian on the highway.

FERDINAND O. SMITH.
WILLIAM V. HIRSCHFELD.